United States Patent [19]

Hirashima et al.

[11] Patent Number: 5,199,845

[45] Date of Patent: Apr. 6, 1993

[54] ARTICLE HANDLING MACHINE

[75] Inventors: Takeshi Hirashima; Atsuhiko Tazawa, both of Kosai, Japan

[73] Assignee: Nitto Kohki Co., Ltd., Tokyo, Japan

[21] Appl. No.: 685,679

[22] Filed: Apr. 16, 1991

[30] Foreign Application Priority Data

Apr. 19, 1990 [JP] Japan .................. 2-41800[U]

[51] Int. Cl.⁵ .................................... B25J 15/08
[52] U.S. Cl. ................................ 414/744.1; 414/740;
414/796.9; 414/799; 901/37; 901/39; 294/86.4
[58] Field of Search ............ 414/744.1, 736, 799,
414/796.9, 928, 740, 729; 294/119.1, 88, 111,
86.4, 3; 901/36, 39, 37

[56] References Cited

U.S. PATENT DOCUMENTS

| 3,561,615 | 2/1971 | Forsberg | 414/745.4 X |
| 4,358,147 | 11/1982 | Hungerford | 294/111 X |
| 4,479,673 | 10/1984 | Inaba et al. | 294/119.1 X |
| 4,557,655 | 12/1985 | Berg | 414/928 X |
| 4,632,444 | 12/1986 | Martinez et al. | 294/86.4 |
| 4,655,664 | 4/1987 | Feichtl et al. | 414/796.9 X |
| 4,978,274 | 12/1990 | de Groot | 414/799 X |

FOREIGN PATENT DOCUMENTS 61-263524 11/1986 Japan .

Primary Examiner—Michael S. Huppert
Assistant Examiner—Donald W. Underwood
Attorney, Agent, or Firm—Nixon & Vanderhye

[57] ABSTRACT

An article handling machine comprises a base, a support supported at its lower end portion on the base rotatably around the vertical axis of the base, an arm having the proximal end portion pivoted to the upper end portion of the support, and an article-pallet holding mechanism mounted on the distal end portion of the arm. The article-pallet holding mechanism has a pair of plate members for holding an article and a plurality pair of fingers for holding a pallet.

12 Claims, 6 Drawing Sheets

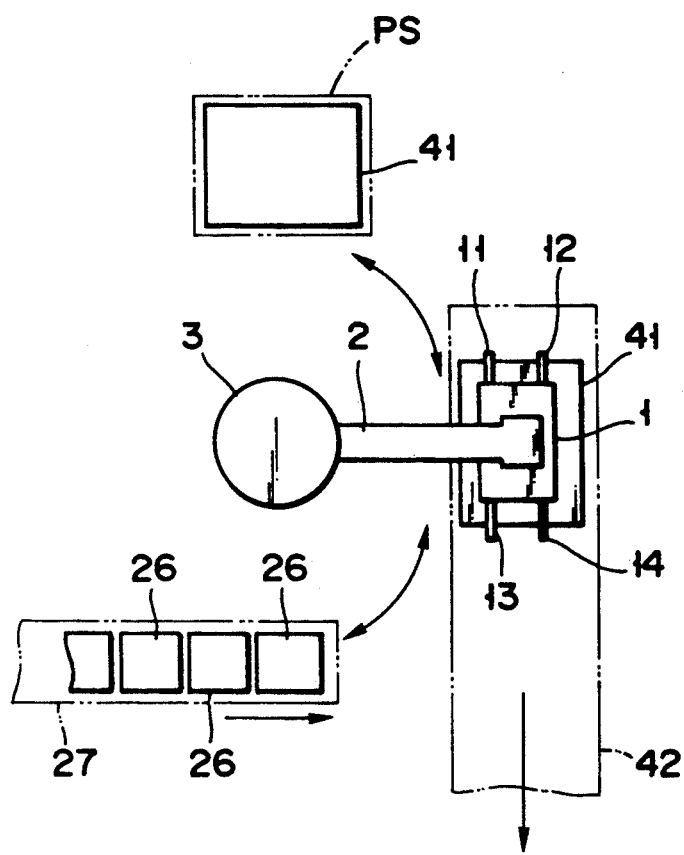
F I G. 6

5,199,845

ARTICLE HANDLING MACHINE

BACKGROUND OF THE INVENTION

1. Field of the Invention

This invention relates to an improvement of an article handling machine for automatizing article handling and handling articles such as cargoes by saving labor.

2. Description of the Related Art

As disclosed in Japanese Laid-open Patent Application Sho 61 No. 263524, a conventional automatic and labor saving article handling machine includes an arm having an article handling hand. The hand picks up, in succession, articles such as cargoes transported by a transporting apparatus such as a roller conveyer or an endless belt and moves them to corresponding pallets.

The conventional article handling machine is of a type for holding an article by vacuum suction means or fingers, or a type of supporting the article in an optimum manner according to the shape of the article or the firmness of package. However, the article handling machine of any type is used only for holding an article. In a conventional article handling system in which, after pallets disposed at a predetermined location have been taken out in turn and articles have been loaded on the respective pallets in succession, the pallets together with the articles are transferred to another location, an apparatus for moving the pallets to said another location and an apparatus for taking out the articles must be separately provided. In the conventional article handling system, therefore, a pallet magazine for taking out pallets in turn and a conveyer prepared separately therefrom for transporting the pallets to said another location are utilized in addition to the article handling machine.

In such the conventional article handling system, the pallets can be transferred together with articles, but the article handling machine is only used for loading the articles on the corresponding pallets. The system requires other separate apparatuses such as a pallet magazine and a pallet conveyer in order to handle the pallets. In consequence, the conventional article handling system is encountered with a problem that it cannot be simplified in structure or cannot saves the floor space.

SUMMARY OF THE INVENTION

The object of this invention is to provide an article handling machine which has a simplified structure and a small floor space so as to economically carry out taking out pallets in turn from a location, loading articles on them and transport the pallets together with the articles thereon to another location.

In order to attain the object, an article handling machine according to this invention comprises a base having a vertical axis, a supporting mechanism having a lower end portion mounted on the base so as to be rotated around the vertical axis of the base and an upper end portion, an arm having a proximal end portion pivoted to the supporting mechanism and a distal end portion, an article-pallet holding mechanism provided on the distal end of the arm and having an article holder and a pallet holder.

The uppermost one of pallets stacked at a location is held by means of the pallet holder and transported to another required location by means of the article handling machine. Thereafter, one of articles, which are collected at a further location or which are transported one by one to a still further predetermined location by a roller conveyer, is held by means of the pallet holder and loaded on the pallet brought to the above-mentioned another location. This handling operation is repeated, thereby transporting the articles to the above-mentioned another location.

Since the separate provision of the article holder and the pallet holder on the distal end portion of the arm allows pallets to be taken out and permits articles to be loaded on the pallets by a single article handling machine, the article handling machine does not need any pallet transporting apparatus such as a pallet magazine or a pallet magazine and a pallet conveyer connected thereto which are used for transporting the pallets in the conventional article handling system. With the article handling system according to this invention, therefore, the floor space is reduced, and the structure and the operation are simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

This invention can be fully understood from the following description by way of a preferred embodiment with reference to the accompanying drawings in which:

FIG. 6 is a plan view of an example of the arrangement of the article handling machine of FIG. 1, explaining how to use the machine.

DETAILED DESCRIPTION OF THE PREFERRED EMBODIMENTS

Figure 1:
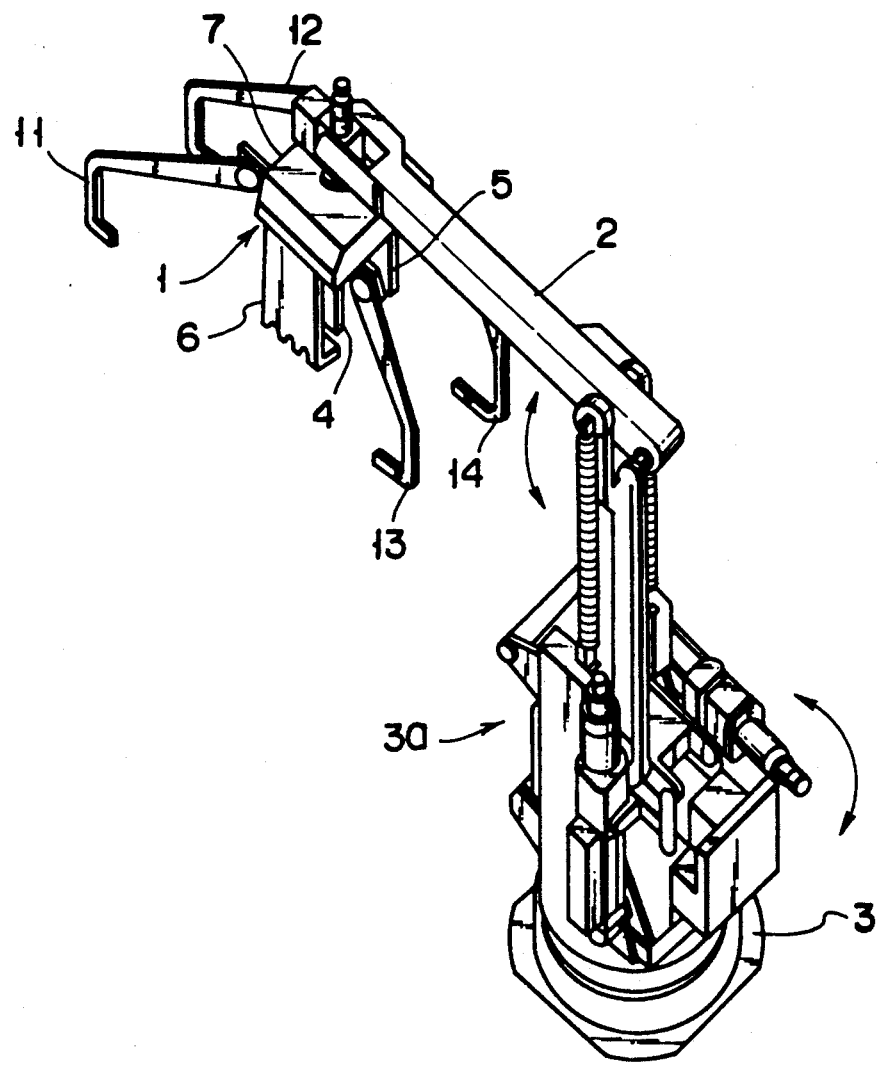
FIG. 1 is a perspective view of an embodiment of an article handling machine according to this invention.

As shown in a perspective view in FIG. 1, an embodied article handling machine comprises a swing type robot arm 2 and an article-pallet holding mechanism 1 (hereinafter referred only to the "holding mechanism") connected to the distal end portion of the arm 2. The proximal end of the robot arm 2 is pivoted to the upper end of a support 3a which is received at its lower end by a base 3 so as to be rotatable around the vertical axis of the base 3. The article handling machine is provided at a location at which the arm 2 can move the arm holding mechanism 1 to any position within a range in which the holding mechanism 1 is accessible.

The holding mechanism 1 has an article holder for holding an article at its forward and rear ends and a pallet holder for holding a pallet at its both lateral sides.

The article holder comprises a pair of facing article holding plates 4 and 5 for holding the article at its forward and rear end faces and a hook plate 6 for supporting the article at its undersurface. The article holding plates 4 and 5 are provided on a frame 7 rotatable in the horizontal planes on the undersurface of the free end portion (or the distal end portion) of the robot arm 2 so as to be opened and closed. The pallet holder comprises two pairs of openable pallet fingers 11, 12, 13 and 14 disposed perpendicularly to the article holding plates 4 and 5 in order to hold the pallet at its lateral sides. The pallet fingers 11, 13 and 12, 14 are fixed to shafts 30 and 31, respectively, in such a manner that the pallet fingers 11 and 13 are slightly offset axially of the shafts 30 and 31 from the pallet fingers 12 and 14, so that the pallet fingers 11 and 12 on the left side in FIG. 1 do not contact the pallet fingers 13 and 14 on right side, when they are folded.

The structure of the holding mechanism 1 will now be explained with reference to FIGS. 2 to 5.

The holding mechanism 1 is provided with a frame 7 having an upper plate 7A. On the central portion of the upper plate 7A is formed a flange 15 for connecting the holding mechanism 1 to the robot arm 2.

Figure 5:
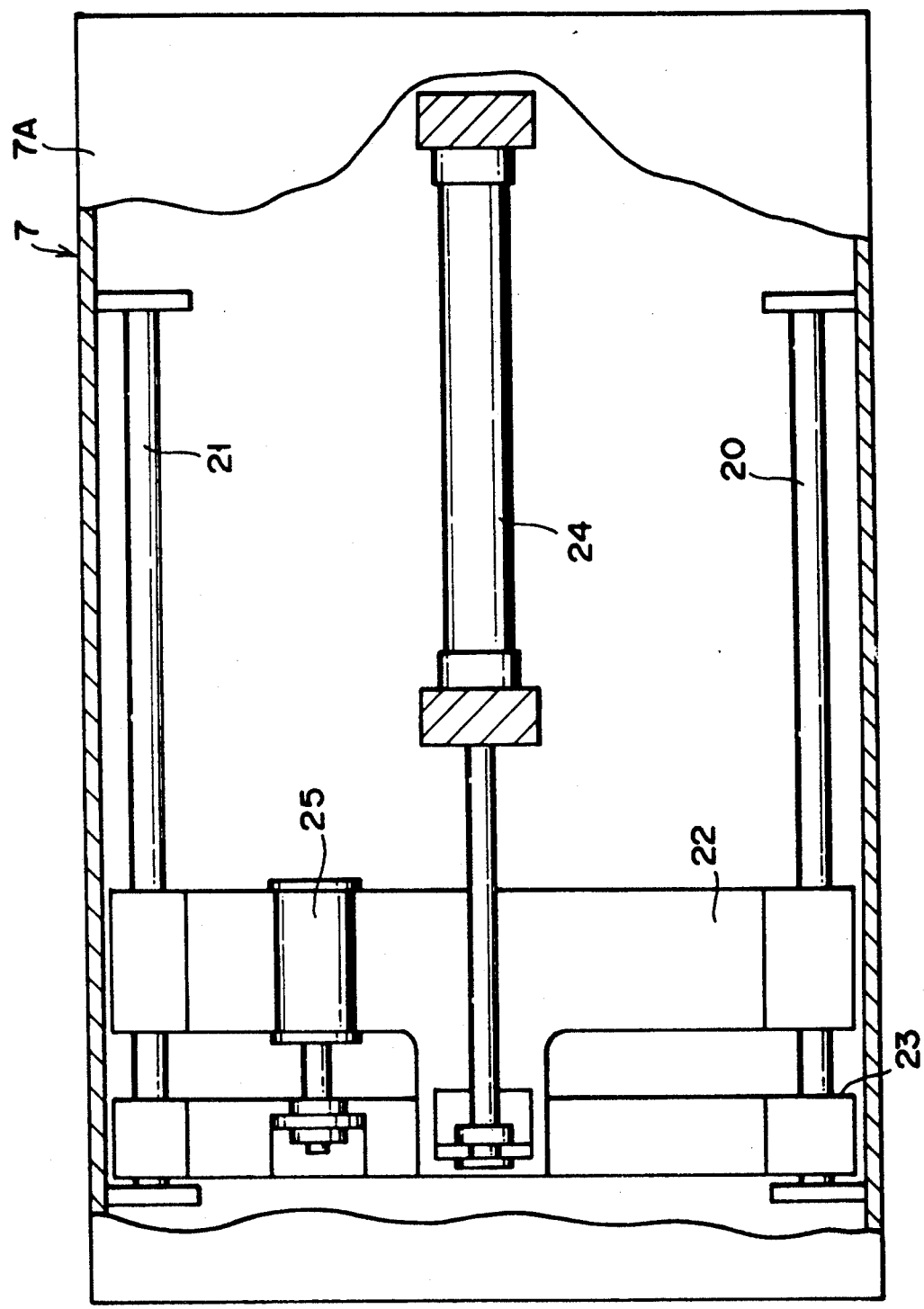
FIG. 5 is a plan view of an air cylinder for an article holding plate members.

On the undersurface of the upper plate 7A are arranged two parallel guide rods 20 and 21 which extend through a first slider 22 and a second slider 23 so as to be slidable in rightward and leftward directions in FIG. 5. The first slider 22 is moved in the rightward and leftward directions by means of a horizontal cylinder 24 fixed to the undersurface of the upper plate 7A. The second slider 23 is connected to the first slider 22 by means of a third cylinder 25. When the third cylinder 25 is not operated, the first and second sliders 22 and 23 are moved together in the same direction by the same length, while the second slider 23 is moved with respect to the first slider 22 so as to be separated therefrom when the third cylinder 25 is operated.

Figure 4:
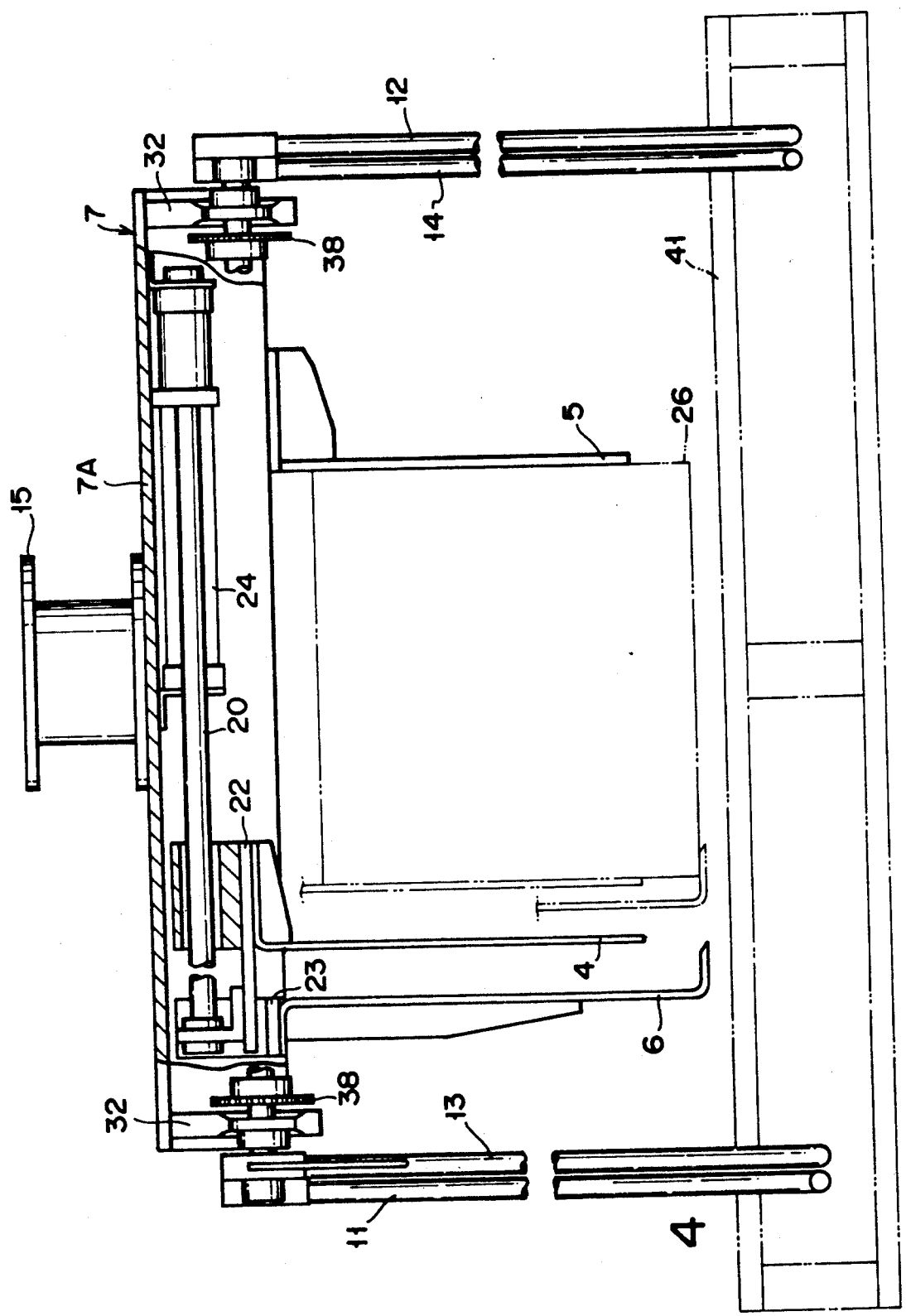
FIG. 4 is a partially broken lateral elevational view of the article handling machine of FIG. 1.

As shown in a front view in FIG. 4, a hook plate 6 is suspended from the second slider 23 with the upper end portion fixed thereto. The left article holding plate 4 is fixed to the undersurface of the first slider 22. The right article holding plate 5 is fixed to the frame 7 so as to be disposed opposed to the left article holding plate 4.

Figure 2:
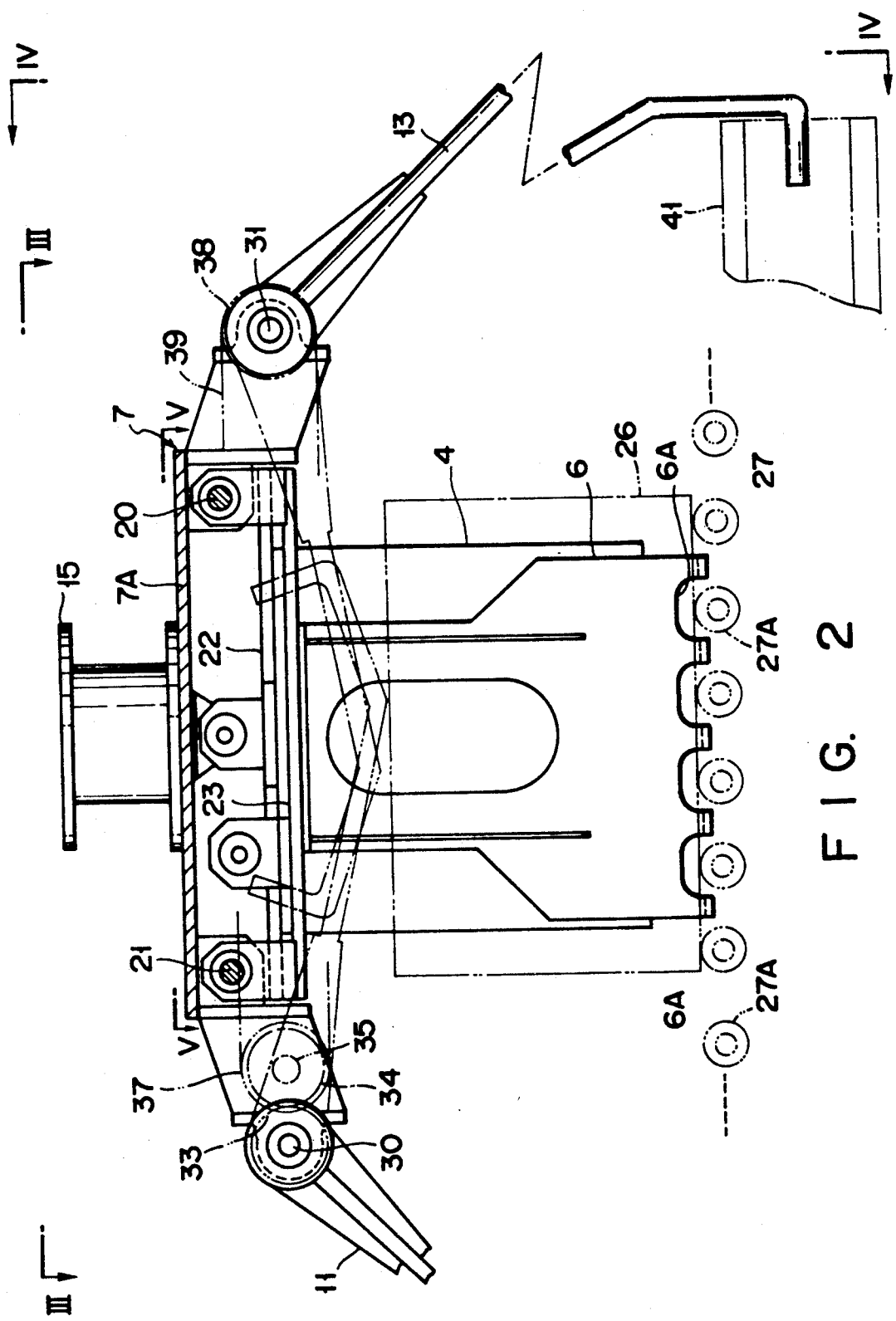
FIG. 2 is a partially broken front view of the article handling machine of FIG. 1.

As seen from FIG. 2, a plurality of notches 6A are formed in the lower edge portion of the hook plate 6 in order that the article on a roller conveyer 27 can be held at its forward and rear ends without causing the lower edge portion of the hook plate 6 to collide with the rollers 27A of the roller conveyer 27.

Figure 3:
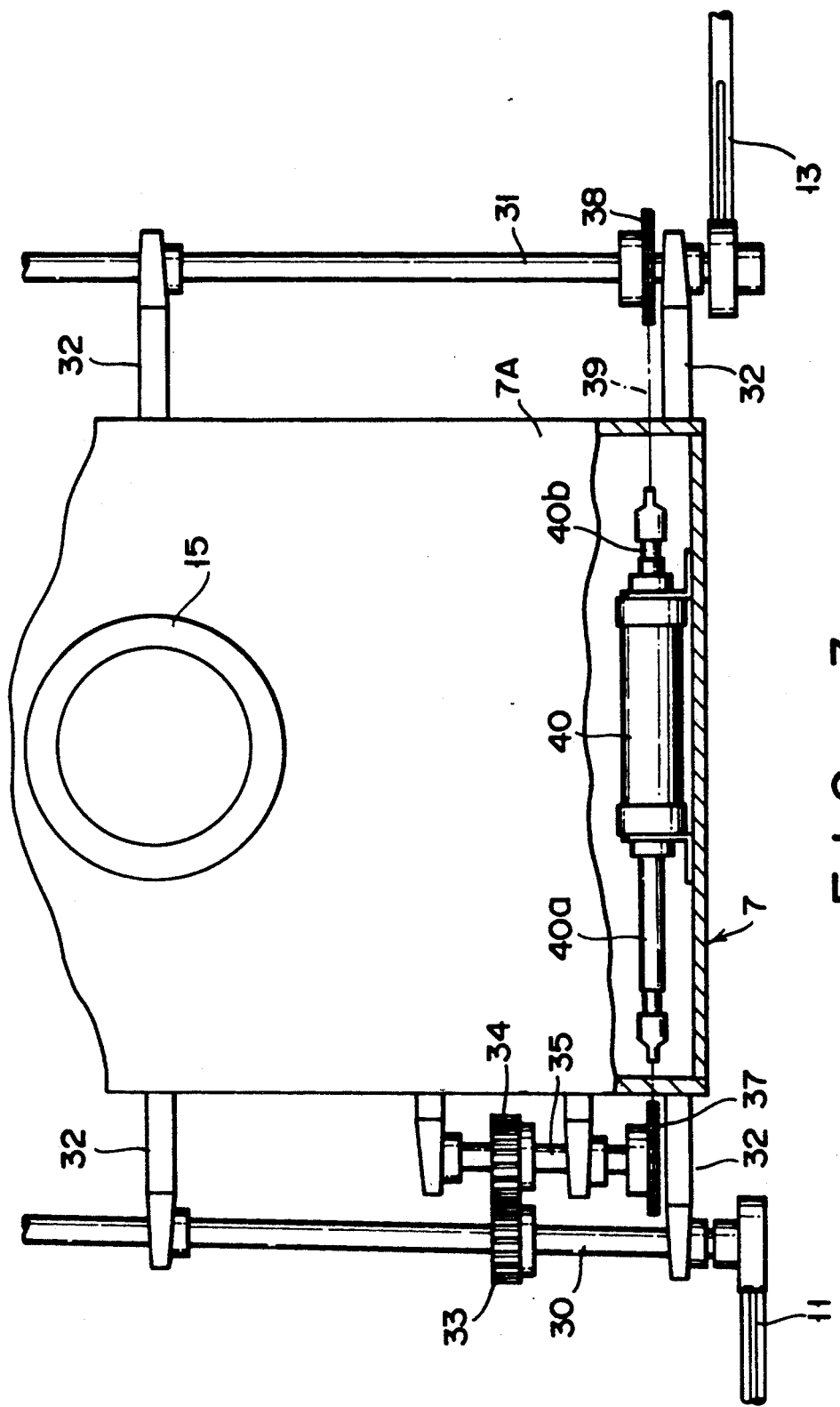
FIG. 3 is a partially broken plan view of the article handling machine of FIG. 1.

As shown in FIGS. 2 and 3, the pallet fingers 11 and 12 and the pallet fingers 13 and 14 are at their upper end portions fixed to the rotary shafts 30 and 31 provided on the right and left sides in symmetry with respect to the vertical central line of the frame 7.

Referring to FIGS. 3 and 4, a force transmission mechanism (or a driving mechanism) will now be explained. The rotary shafts 30 and 31 are rotatably supported by a bracket 32 formed on the frame 7. A spur gear 33 is fixed to the rotary shaft 30 and engages a spur gear 34 having the same number of teeth as the spur gear 33 and fixed to a drive shaft 35 pivotally mounted on the left side portion of the frame 7. Sprocket wheels 37 and 38 are fixed to the drive shaft 35 and the rotary shaft 31, respectively, and a chain 39 having both ends are wound therearound and so as to be stretched therebetween. The ends of the chain 39 are fixed to the respective ends of piston rods 40a and 40b projecting from the corresponding ends of an air cylinder 40 so that the traction force toward the left side or the right side is transmitted from the air cylinder 40 to the chain 39.

When the force transmission mechanism is operated, the sprocket wheels 37 and 38 are rotated. The rotation of the sprocket wheels 37 and 38 is transmitted alternatively in two routes. In a route, the rotary shaft 31 is directly driven so that the pallet fingers 13 and 14 are caused to relate in one direction. In the other route, the rotary shaft 30 is rotated in the direction reverse to that of the rotary shaft 31 so that the pallet fingers 13 and 14 are rotated in the direction reverse to that in the first route.

Referring to FIG. 2, as the pallet fingers 11 to 14 are gradually closed from the opened state, the pawl portions formed on the free ends of the pallet fingers 11 to 14 are inserted into a space defined between the upper plate and the lower plate of a pallet 41 and hold the pallet 41 at its upper plate. When the pallet fingers 11 to 14 are opened, the pallet 41 is released therefrom.

The operation of this embodiment will now be explained.

In FIG. 6 is shown a location PS (hereinafter referred to as the "preparation location") at which many pallets 41 are stacked. The base 3 of the article handling machine is set at a location at which the holding mechanism 1 is accessible to the preparation location PS. The terminal portion of the roller conveyer 27 is arranged at such a location that the base 3 of the article handling machine is disposed at the central portion between the terminal portion of the roller conveyer 27 and the preparation location PS. In front of the location PS, the base 3 and the terminal portion is provided a pallet conveyer 42 for moving articles 26 loaded on pallets 42.

After the arm 2 has been turned to be moved to the preparation location PS, the uppermost pallet 41 is held by the closing operation of the pallet fingers 11 to 14 by means of the air cylinder 40 and is moved by the arm 2 so as to be located over a required loading position of the pallet conveyer 42. Then, the pallet 42 is released so as to be loaded on the pallet conveyer 42 at the loading position.

The pallet fingers 11 to 14 are folded and the arm 2 is moved so that the holding mechanism 1 is positioned right over the waiting article 26 on &he terminal portion of the roller conveyer 27. Thereafter, the holding plate 4 and the hook plate 6 are moved toward the holding plate 5 by actuating the air cylinders 24 and 25 so that the holding plated 4 and 5 hold the article 26 at its both lateral sides and the hook plate 6 supports the article 26 at its undersurface. The article 26 held by the holding mechanism 1 is moved to a position over the loading position on the pallet conveyer 42 and put on the pallet 41.

In this way, a particle 26 is loaded on the pallet 41 located on the preparation position of the pallet conveyer 42. This process is repeated until the required number of sets of article-pallet assemblies are stacked on the loading position on the pallet conveyer 42. Thereafter, the stacked assemblies are transported to a transported location by moving the pallet conveyer 42 in the direction as shown in FIG. 6. This cycle is repeated as many times as required.

As apparent from the above explanation, the article handling machine according to this invention brings pallets one by one to a required transferred location and loads articles in turn on the pallets at the transferred location without using a pallet magazine and a conveyer for transporting pallets taken out from the magazine to the location at which articles are loaded on the pallets.

This invention is not limited to the above-mentioned embodiment, but various modifications are available within the scope of this invention.

For example, the holding mechanism which comprises holding plates and a hook plate in the above embodiment may be replaced by a vacuum absorbing device or combination of pallet fingers each having the structure similar to that of the hook plate. Further, the driving mechanism of the pallet fingers, such as a cylinder or cylinders or a chain is replaced by a link mechanism.

Additional advantages and modifications will readily occur to those skilled in the art. Therefore, the invention in its broader aspects is not imited to the specific details, and representative devices, shown and described herein. Accordingly, various modifications may be made without departing from the spirit or scope of the general inventive concept as defined by the appended claims and their equivalents.

What is claimed is:

1. An article handling machine comprising:
   a base having a vertical axis;
   a support having a lower end portion mounted on said base for rotation about said vertical axis of said base;
   an arm having a proximal end portion pivoted to said support and a distal end portion;
   lifting means provide don said distal end portion of said arm for lifting an article and a pallet;
   said lifting means having a pair of plate members to clamp the article and pallet holding means to support the pallet;
   at least one of said pair of plate members being movable such that said plate members open and close in a first direction, said pallet holding means comprising movable means which open and close in a second direction perpendicular to said first direction;
   said lifting means further comprising a frame having an undersurface and drive means for moving said one plate member toward and away from said other plate member in said first direction, said other plate member being fixed to said undersurface;
   a hook plate disposed so that said hook plate and said other plate member sandwich said one plate member and the article therebetween;
   said hook plate including a lower edge portion and a pawl portion extending from said lower portion toward said other plate member, for holding an article at an undersurface thereof; and
   said lifting means further comprising a first cylinder fixed to said frame for moving said one plate member and said hook plate in said first direction, and a second cylinder fixed to said one plate member for moving said hook plate in said first direction with respect to said one plate member.

2. The machine according to claim 1, wherein said pawl portion is provided with a plurality of notches arranged at equal intervals.

3. The machine according to claim 1, wherein said pallet holding means comprises at least one pair of holding fingers.

4. The machine according to claim 3, wherein said pallet holding means further comprises driving means for moving said fingers at an equal speed in said second direction.

5. The machine according to claim 4, wherein said pallet holding means further comprises a frame, and said driving means comprises a first rotary shaft rotatably mounted on said frame and having one of said fingers fixed thereto, a second rotary shaft rotatably mounted on said frame and having the other finger fixed thereto, and a driving mechanism for rotating said first and second rotary shafts in reverse directions to each other.

6. An article handling machine comprising:
   a base having a vertical axis;
   a support having a lower end portion mounted on said base for rotation about said vertical axis of said base;
   an arm having a proximal end portion pivoted to said support and a distal end portion;
   lifting means provided on said distal end portion of said arm for lifting an article and a pallet;
   said lifting means having a pair of plate members to clamp the article and pallet holding means to support the pallet;
   at least one of said pair of plate members being movable such that said plate members open and close in a first direction, said pallet holding means comprising movable means which open and close in a second direction perpendicular to said first direction;
   said pallet holding means comprising at least one pair of holding fingers and driving means for moving said fingers at an equal speed in said second direction;
   said pallet holding means further comprising a frame, and said driving means comprising a first rotary shaft rotatably mounted on said frame and having one of said fingers fixed thereto, a second rotary shaft rotatably mounted on said frame and having the other finger fixed thereto, and a driving mechanism for rotating said first and second rotary shafts in reverse directions to each other;
   said driving mechanism comprising gears, a first sprocket for rotating said first rotary shaft via said gears, a second sprocket coaxially fixed to said second shaft, a chain having two ends and wound about said first and second sprockets and an air cylinder having two ends connected to the respective ends of said chain.

7. An article handling machine comprising:
   a base having a vertical axis;
   a support having a lower end portion mounted on said base for rotation about said vertical axis of said base;
   an arm having a proximal end portion pivoted to said support and a distal end portion;
   lifting means provided on said distal end portion of said arm for lifting an article and a pallet;
   said lifting means including a pair of plate members for clamping the article therebetween and pallet holding means to support the pallet transversely to said plate member;
   at least one of said pair of plate members being linearly movable toward and away from the other of said plate members in a first direction such that said plate members define open and closed positions;
   means for moving said at least one plate member toward and away from the other plate member;
   said pallet holding means comprising fingers on opposite sides of said lifting means rotatable about axes generally parallel to said first direction for movement toward and away from one another in a second direction generally perpendicular to said first direction;

means for rotating said fingers about said axes;

a frame, said finger rotating means comprising a first rotary shaft rotatably mounted on said frame and having one of said fingers fixed thereto, a second rotary shaft rotatably mounted on said frame and having an opposite finger fixed thereto, and a driving mechanism for rotating said first and second rotary shafts in reverse directions to each other for pivoting said fingers toward and away from one another; and said driving mechanism comprising gears, a first sprocket for rotating said first rotary shaft via said gears, a second sprocket coaxially fixed to said second shaft, a chain having two ends and wound about said first and second sprockets, and an air cylinder having two ends connected to the respective ends of said chain.

8. A machine according to claim 7 further comprising a hook plate disposed so that said hook plate and said other plate member sandwich said one plate member and the article therebetween.

9. A machine according to claim 8 wherein said hook plate includes a lower edge portion and a pawl portion extending from said lower portion toward said other plate member, for holding an article at an undersurface thereof.

10. A machine according to claim 9 wherein said lifting means further comprises a first cylinder fixed to said frame for moving said one plate member and said hook plate in said first direction, and a second cylinder fixed to said one plate member for moving said hook plate in said first direction with respect to said one plate member.

11. A machine according to claim 9 wherein said pawl portion is provided with a plurality of notches arranged at equal intervals.

12. A machine according to claim 7 further comprising a hook plate having a generally horizontally extending surface for underlying an article, said hook plate being movable linearly in said first direction to a location such that said horizontal surface underlies one of said plate members and means for moving said hook plate in said first direction.

* * * * *